United States Patent
Wang et al.

(10) Patent No.: US 11,748,139 B2
(45) Date of Patent: Sep. 5, 2023

(54) DYNAMIC OVER-PROVISIONING OF SPACE IN A LOG-STRUCTURED FILE SYSTEM

(71) Applicant: VMware, Inc., Palo Alto, CA (US)

(72) Inventors: Wenguang Wang, Palo Alto, CA (US); Vamsi Gunturu, Palo Alto, CA (US); Eric Knauft, Palo Alto, CA (US); Pascal Renauld, Palo Alto, CA (US); Matt Amdur, Palo Alto, CA (US); Blake Lewis, Palo Alto, CA (US); Peng Mi, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 207 days.

(21) Appl. No.: 16/999,569

(22) Filed: Aug. 21, 2020

(65) Prior Publication Data

US 2022/0058043 A1    Feb. 24, 2022

(51) Int. Cl.
*G06F 9/455* (2018.01)
*G06F 16/188* (2019.01)
*G06F 12/02* (2006.01)

(52) U.S. Cl.
CPC ...... *G06F 9/45558* (2013.01); *G06F 12/0253* (2013.01); *G06F 16/188* (2019.01); *G06F 2009/45583* (2013.01); *G06F 2212/1044* (2013.01)

(58) Field of Classification Search
None
See application file for complete search history.

(56) References Cited

U.S. PATENT DOCUMENTS

| | | | |
|---|---|---|---|
| 6,745,207 B2 | 6/2004 | Reuter et al. | |
| 6,857,059 B2 | 2/2005 | Karpoff et al. | |
| 7,827,447 B2 | 11/2010 | Eberbach et al. | |
| 8,489,558 B2 | 7/2013 | Leigh | |
| 10,528,282 B2 | 1/2020 | Kaczmarek et al. | |

(Continued)

OTHER PUBLICATIONS

Rosenblum, et al., "The Design and Implementation of a Log-Structured File System"; Electrical Engineering and Computer Sciences, Computer Science Division, University of California (Jul. 24, 1991 (15 pgs).

(Continued)

*Primary Examiner* — Wynuel S Aquino

(57) ABSTRACT

The present disclosure is related to methods, systems, and machine-readable media for log-structured file system management operations. An aggregate amount of over-provisioned computing resources assigned to a plurality of log-structured file system (LFS) objects that are allocated for performance of memory management operations associated with a virtual storage area network (vSAN) can be determined. A subset of LFS objects that are candidates for performance of a particular memory management operation based on an amount of over-provisioned computing resources consumed by one or more LFS objects among the plurality of LFS objects exceeding a resource consumption threshold associated with the determined amount of over-provisioned computing resources assigned to the plurality of LFS objects can be selected. The particular memory management operation using one or more of the candidate LFS objects can be performed.

20 Claims, 4 Drawing Sheets

(56) References Cited

U.S. PATENT DOCUMENTS

| | | | |
|---|---|---|---|
| 2014/0025770 A1* | 1/2014 | Warfield | H04L 41/12 709/213 |
| 2018/0018269 A1* | 1/2018 | Jannyavula Venkata | G06F 12/0868 |
| 2020/0210219 A1* | 7/2020 | Kim | G06F 9/45558 |
| 2020/0363975 A1* | 11/2020 | Subramanian | G06F 3/0604 |
| 2022/0019502 A1* | 1/2022 | Mylavarapu | G06F 11/3037 |

OTHER PUBLICATIONS

Seagate: "SSD Over-Provisioning And it's Benefits" https://www.seagate.com/tech-insights/ssd-over-provisioning-benefits-master-ti/ Accesed: Jul. 8, 2020 (7 pgs).

Wang, et al., "HyLog: A High Performance Approach to Managing Disk Layout"; USENIX Association, Proceedings of the Third USENIX Conference on File and Storage Technologies, (Mar. 31-Apr. 2, 2004) (15 pgs).

* cited by examiner

DYNAMIC OVER-PROVISIONING OF SPACE IN A LOG-STRUCTURED FILE SYSTEM

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use.

Virtual computing instances (VCIs) have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. In a software defined data center, storage resources may be allocated to VCIs in various ways, such as through network attached storage (NAS), a storage area network (SAN) such as fiber channel and/or Internet small computer system interface (i SCSI), and/or raw device mappings, among others.

DETAILED DESCRIPTION

Figure 1:
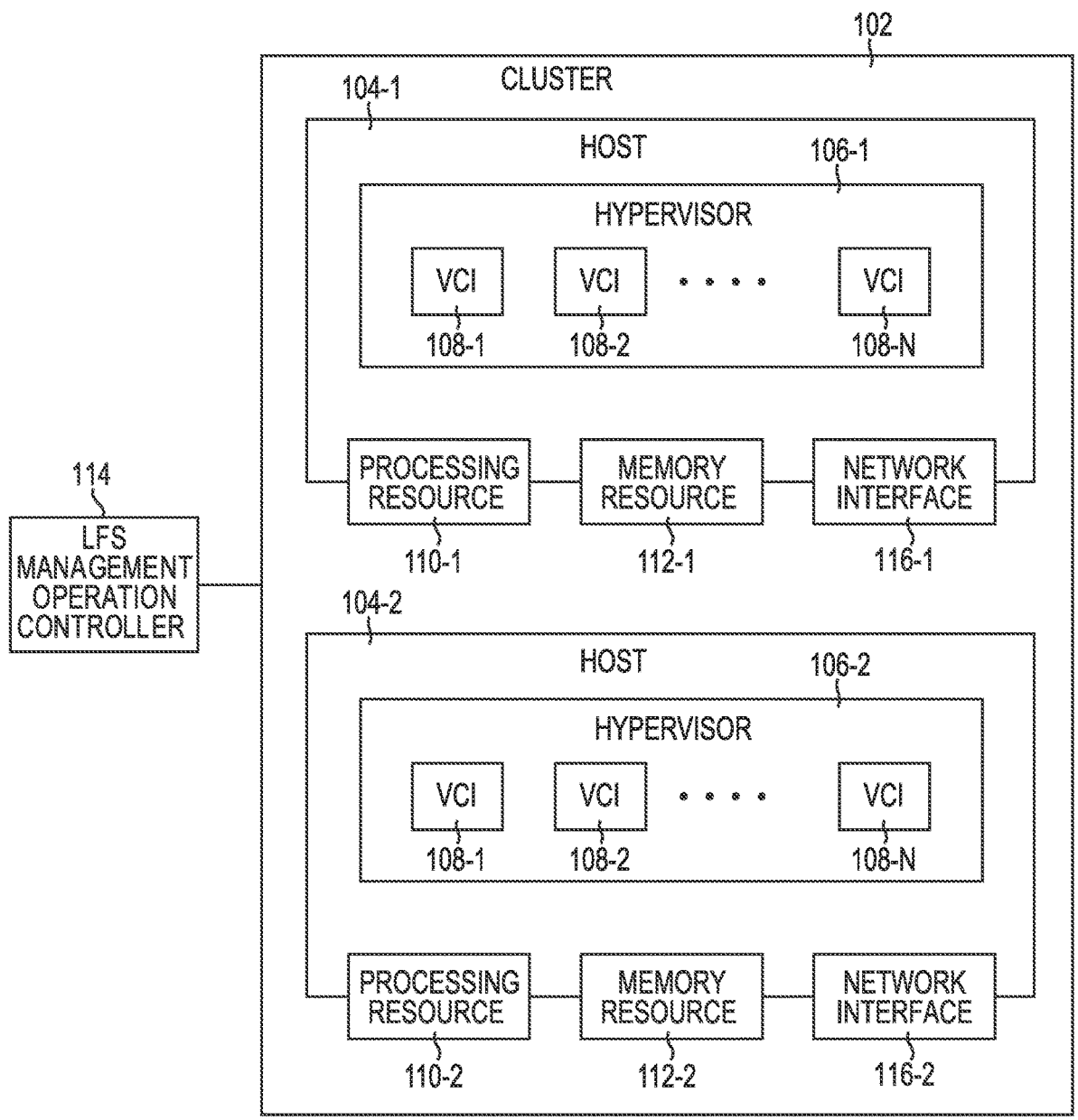
FIG. 1 is a diagram of a host and a system for log-structured file system memory management operations according to one or more embodiments of the present disclosure.

The term "virtual computing instance" (VCI) refers generally to an isolated user space instance, which can be executed within a virtualized environment. Other technologies aside from hardware virtualization can provide isolated user space instances, also referred to as data compute nodes. Data compute nodes may include non-virtualized physical hosts, VCIs, containers that run on top of a host operating system without a hypervisor or separate operating system, and/or hypervisor kernel network interface modules, among others. Hypervisor kernel network interface modules are non-VCI data compute nodes that include a network stack with a hypervisor kernel network interface and receive/transmit threads.

VCIs, in some embodiments, operate with their own guest operating systems on a host using resources of the host virtualized by virtualization software (e.g., a hypervisor, virtual machine monitor, etc.). The tenant (i.e., the owner of the VCI) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VCI segregation that may be offered in hypervisor-virtualized environments that virtualize system hardware, and thus can be viewed as a form of virtualization that isolates different groups of applications that operate in different containers. Such containers may be more lightweight than VCIs.

While the specification refers generally to VCIs, the examples given could be any type of data compute node, including physical hosts, VCIs, non-VCI containers, and hypervisor kernel network interface modules. Embodiments of the present disclosure can include combinations of different types of data compute nodes.

As used herein with respect to VCIs, a "disk" is a representation of memory resources (e.g., memory resources 110 illustrated in FIG. 1) that are used by a VCI. As used herein, "memory resource" includes primary storage (e.g., cache memory, registers, and/or main memory such as random access memory (RAM)) and secondary or other storage (e.g., mass storage such as hard drives, solid state drives, NVMe devices, Persistent Memory, removable media, etc., which may include non-volatile memory). The term "disk" does not imply a single physical memory device. Rather, "disk" implies a portion of memory resources that are being used by a VCI, regardless of how many physical devices provide the memory resources.

Certain file systems, such as a log-structured file system (LFS), can utilize over-provisioned space to allow for performance of memory management operations (e.g., garbage collection operations, segment cleaning operations, or other operations in which data is migrated from one portion of a memory resource to another to free up memory resources within a computing system). As used herein, the term "file system" generally refers to an organizational structure utilized by a computing system to control storage and retrieval of data associated with the computing system. Further, as used herein, the term "over-provisioned space" (and similar derivatives) generally refers to an amount of computing resources (e.g., physical computing resources, such as memory resources and/or storage resources) that can be reserved for performance of certain computing operations, such as memory management operations. In such contexts, the term "space" can refer to an amount of physical memory and/or storage resources (e.g., memory segments, storage locations, memory blocks, etc.) available to a computing system or host, such as a software defined data center.

Further, as used herein, the term "memory management operations" (and similar derivatives) generally refers to system-level computing operations that are performed in the course of operation of a computing system or host, such as a software defined data center to maintain and/or improve the functioning of the computing system or host (in contrast to user operations, for example). Non-limiting examples of "memory management operations" include both background and foreground operations such as garbage collection, segment cleaning, error correction, and the like.

The amount of over-provisioned space utilized can be dependent on workloads processed by data compute nodes in a distributed computing architecture. In general, write-heavy workloads can utilize a larger amount of over-provisioned space while workloads with less writes can utilize a smaller amount of over-provisioned space. In addition, write pattern locality can affect an amount of over-provisioned space utilized by the file system. For example, if a write pattern exhibits poor locality, more over-provisioned space is needed. As used herein, the term "locality" refers to a relative dispersion of file system writes within physical memory resources of a computing system. For example, if the write pattern is characterized by frequent, relatively small, and/or non-consecutive writes that have not been written in the near past, the write pattern can be said to exhibit a relatively poor locality. Conversely, if the write pattern is characterized by infrequent, large, and/or consecutive writes, or data has been recently written are written again, the write pattern can be said to exhibit a relatively good locality. In some embodiments, an amount of over-provisioned space utilized by the file system can increase in response to write patterns that exhibit poor locality in comparison to an amount of over-provisioned space utilized for write patterns that exhibit good locality.

In some approaches, a predetermined amount of space may be reserved (e.g., over-provisioned) for performance of memory management operations, such as garbage collection and/or segment cleaning. As an example, some approaches that utilize LFS in a flash translation layer of a data compute node can over-provision around 7% of the available storage within the flash translation layer to account for various management operations. Such approaches can further reserve an additional 7% in the overall computing cluster capacity to account for various memory management operations. However, within the virtual storage area network (vSAN) control path, around 7% of the available storage space can be reserved for such memory management operations. This can lead to scenarios in which around 7% of the available storage space to the vSAN layer can be reserved once (e.g., on initiation of the cluster) to be allocated to each node in the cluster such that, at the vSAN layer, each node has around 7% over-provisioned space reserved for memory management operations.

However, because DOM can operate on a per-object level and a vSAN can include thousands or more objects that can exhibit differing write patterns, some approaches can lead to scenarios in which the over-provisioned space is either too great (thereby reducing available resources unnecessarily) or too small (thereby hampering efficient performance of read/write operations). In order to mitigate the effects of over-provisioning too many or too few resources for memory management operations, embodiments described herein can allow for the over-provisioned space to be shared between objects that are associated with data compute nodes of a distributed computing architecture such that the overhead (e.g., the segment cleaning overhead) corresponding to performance of memory management operations is as low as possible even if, for some infrequently written objects, the overhead corresponding to performance of the memory management operations is increased.

In an illustrative and non-limiting example, multiple objects (e.g., LFS objects) having a same size (e.g., 100 GB for each object) can be associated with a vSAN. Some of the objects ("Obj 1" in this example) can be characterized by large writes and/or contiguous writes while other objects ("Obj 2" in this example) can be characterized by small and/or random writes. In this example, for each write of Obj 1, 0.01 additional writes can be used for read/write operations. However, for each write of Obj 2, three additional writes can be used for read/write operations. Based solely on this, it may seem reasonable to allocate more over-provisioned space to Obj 2 than to Obj 1 due to the larger quantity of additional writes associated with performing memory management operations corresponding to writes associated with Obj 2, and some approaches do, in fact, rely on over-provisioning additional resources to objects that have characteristics similar to Obj 2.

Such simplistic approaches, however, fail to account for differing input/output (I/O) loads that can be associated with objects that have characteristics similar to the above described Obj 1 and Obj 2. Continuing with the above example, if Obj 1 is involved in 1,000,000 writes per minute and Obj 2 is involved in 100 writes per minute, an additional 10,000 writes can be used for read/write operations associated with Obj 1 while only 300 additional writes can be used for read/write operations associated with Obj 2. It is therefore an objective of the present disclosure to reduce the overall overhead allocated for performance of read/write operations by accounting for I/O loads associated with writes of objects that exhibit particular characteristics (e.g., object size, frequency of writes, contiguous writes vs. non-contiguous writes, etc.).

Accordingly, by utilizing adaptive memory management operation (e.g., an adaptive garbage collection and/or an adaptive segment cleaning) methodologies, embodiments described herein can achieve reduced overall overhead consumption in comparison to approaches in which static amounts of resources are over-provisioned. For example, by sharing the over-provisioned space between all objects associated with data compute nodes, and thereby allowing each object to essentially compete with other objects for over-provisioned space, embodiments described herein can reduce, for example, the overall segment cleaning overhead utilized by a data compute node in comparison to approaches in which predetermined amounts of resources are over-provisioned for memory management operations.

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 314 in FIG. 3. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a diagram of a host and a system for log-structured file system memory management operations according to one or more embodiments of the present disclosure. The system can include a cluster 102 in communication with a log-structured file system (LFS) management operation controller 114. The cluster 102 can include a first host 104-1 with processing resources 110-1 (e.g., a number of processors), memory resources 112-1, and/or a network interface 116-1. Similarly, the cluster 102 can include a second host 104-2 with processing resources 110-2, memory resources 112-2, and/or a network interface 116-2. Though two hosts are shown in FIG. 1 for purposes of illustration, embodiments of the present disclosure are not limited to a particular number of hosts. For purposes of clarity, the first host 104-1 and/or the second host 104-2 (and/or additional hosts not illustrated in FIG. 1) may be generally referred to as "host 104." Similarly, reference is made to "hypervisor 106," "VCI 108," "processing resources 110," memory resources 112," and "network interface 116," and such usage is not to be taken in a limiting sense.

The host 104 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 104-1 can incorporate a hypervisor 106-1 that can execute a number of VCIs 108-1, 108-2, . . . , 108-N (referred to generally herein as "VCIs 108"). Likewise, the host 104-2 can incorporate a hypervisor 106-2 that can execute a number of VCIs 108. The hypervisor 106-1 and the hypervisor 106-2 are referred to generally herein as a hypervisor 106. The VCIs 108 can be provisioned with processing resources 110 and/or memory resources 112 and can communicate via the network interface 116. The processing resources 110 and the memory resources 112 provisioned to the VCIs 108 can be local and/or remote to the host 104. For example, in a software defined data center, the VCIs 108 can be provisioned with resources that are generally available to the software defined data center and not tied to any particular hardware device. By way of example, the memory resources 112 can include volatile and/or non-volatile memory available to the VCIs 108. The VCIs 108 can be moved to different hosts (not specifically illustrated), such that a different hypervisor manages (e.g., executes) the VCIs 108. The host 104 can be in communication with the LFS management operation controller 114. In some embodiments, the LFS management operation controller 114 can be deployed on a server, such as a web server.

The LFS management operation controller 114 can include computing resources (e.g., processing resources and/or memory resources in the form of hardware, circuitry, and/or logic, etc.) to perform various operations to alter an amount of over-provisioned space (e.g., memory resources) available to the cluster 102 to perform memory management operations associated with a storage area network, such as a virtual storage area network (vSAN). The memory management operations can, in some embodiments, include garbage collection operations and/or segment cleaning operations that are performed during operation of the host 102. Accordingly, in some embodiments, the LFS management operation controller 114 can be part of a cluster controller (e.g., a vSAN cluster manager). In embodiments in which the LFS management operation controller 114 is part of a vSAN cluster controller, the local disks of the hosts 104-1 and 104-2 can act as pooled storage for the cluster 102 (e.g., a datastore) that can store data corresponding to the VCIs 108-1, . . . , 108-N as objects (as opposed to files).

In some embodiments, the LFS management operation controller 114 (or cluster manager on which the LFS management operation controller 114 is deployed) can manage multiple LFSs and overprovision memory resources 112-1 and 112-2 from the hosts 104-1 and 104-2 for each LFS. Accordingly, in some embodiments, the memory resources 112-1 and 112-2 can be treated as a single collective storage volume for the cluster 102 that is divided up amongst the LFSs, with each LFS being part of the DOM object space.

For example, in some embodiments, the LFS management operation controller 114 can determine an amount of over-provisioned computing resources assigned to a plurality of LFS objects that are allocated for performance of memory management operations associated with a vSAN and select a subset of LFS objects that are candidates for performance of a particular memory management operation based on the determined amount of over-provisioned computing resources consumed by each LFS object exceeding a resource consumption threshold. In some embodiments, the LFS management operation system can perform the particular memory management operation on at least one memory segment in which at least a portion of one or more of candidate LFS objects is stored. In addition, the LFS management operation controller 114 can perform the operations discussed in connection with FIGS. 2A-2C, 3, 4, and 5, herein.

As described above, by altering the amount of over-provisioned space available to perform memory management operations associated with the vSAN, as described herein, an amount of space (e.g., over-provisioned space) available to the cluster 102 can be more efficiently utilized in comparison to approaches that maintain a fixed percentage of over-provisioned space for performance of memory management operations associated with the vSAN, thereby improving the overall functioning of a computing system such as the cluster 102.

Figure 2A:
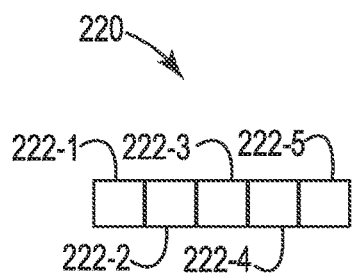
FIGS. 2A-2C are diagrams illustrating altering an amount of over-provisioned space in a log-structured file system according to one or more embodiments of the present disclosure.
Figure 2B:
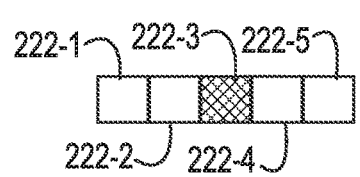
Figure 2C:
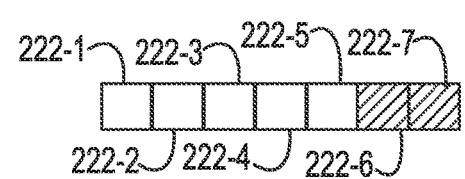

FIGS. 2A-2C are diagrams 220 illustrating altering an amount of over-provisioned space (e.g., computing resources, such as memory resources) in a log-structured file system according to one or more embodiments of the present disclosure. Each of the diagrams 220 shows a plurality of memory segments 222-1, 222-2, 222-3, 222-4, 222-5, 222-6, and 222-7 (e.g., blocks of memory, memory segments, etc.) that can be provided as over-provisioned memory in a cluster, such as the cluster 102 illustrated in FIG. 1, herein. Although shown in FIGS. 2A and 2B as five (5) distinct memory segments 222-1, . . . , 222-5, and in FIG. 2C as seven (7) distinct memory segments 222-1, . . . , 222-7, embodiments are not so limited and other quantities (e.g., fewer than five or greater than seven) of memory segments 222 are contemplated within the scope of the disclosure. As used herein, the term "memory segment" generally refers to a contiguous portion of physical memory addresses within a memory resource or a storage resource. A memory segment can include one or more memory blocks, memory sectors, memory pages, and the like.

In FIG. 2A, each of the memory segments 222-1, . . . , 222-5 is a memory segment allocated as over-provisioned space for a computing system. However, as described herein, at some point in time during operation of the computing system (e.g., a software defined data center) associated with the memory segments 222-1, . . . , 222-5, it may be desirable to decrease the quantity of memory segments 222-1, . . . , 222-5 (as shown in FIG. 2B) or increase the quantity of memory segments 222-1, . . . , 222-7 (as shown in FIG. 2C) provided as over-provisioned space for performance of memory management operations.

In some embodiments, a data structure (e.g., a "segment usage table" (SUT)) can store indexing information corresponding to the physical addresses of the memory segments 222-1, . . . , 222-5 in which object data is stored. The data structure can be stored in the host 102 (e.g., within the memory resource 110) illustrated in FIG. 1 and/or the LFS management operation controller 114 illustrated in FIG. 1, among other locations. The data structure can include an array of entries that include indexing information and can be indexed by a segment index. The segment index can be assigned based on a ratio of a memory segment number (e.g., address location or offset) and a quantity of data associated with memory segment. For example, if the segment size is one hundred blocks, a fifth block would be located in a zeroth segment (since five is within the one hundred block segment size) while a two hundred and thirteenth block would be located in a second segment (since 213/100=2).

As is well known in the art, entries corresponding to physical memory segments can be mapped across an address space that corresponds to memory spaces in which data is written or stored, or from which data is read. By unmapping entries of the address space of the data structure, it can be possible to reallocate memory segments 222-1, . . . , 222-5 that were assigned as over-provisioned space in the event that less over-provisioned space is desired, as described in connection with FIG. 2B. Conversely, by remapping entries of the address space of the data structure, it can be possible to reallocate memory segments 222-1, . . . , 222-5 that were not assigned as over-provisioned space in the event that more over-provisioned space is desired, as described in connection with FIG. 2C.

In FIG. 2B, at least one entry of the data structure has been unmapped to free up a memory segment (e.g., the memory segments 222-3) that was allocated as over-provisioned space in FIG. 2A. An example of a Segment Usage Table (SUT) definition below can be used, where the new "isHole" field bit is set to 1 to track which segment has been unmapped to reduce the over-provisioned space of this object so it should not be reused as a free segment accepting new objects:

struct SUT {
  int numLiveBlocks;
  int isHole;
  int next, prev
};

After an entry in the data structure has been unmapped, for example, by executing the example SUT definition above, the unmapped memory segment can be allocated for "normal" use (e.g., not as over-provisioned space) for the computing system.

In FIG. 2C, two entries of the data structure have been remapped to increase a quantity of memory segments (e.g., the memory segments 222-6 and 222-7) allocated as over-provisioned space. For example, some memory segments (e.g., the memory segments 222-6 and 222-7) may have been previously allocated for "normal" use (e.g., not as over-provisioned space) at some prior to determining that additional over-provisioned space may be beneficial to the computing system. Accordingly, in FIG. 2C, the two additional memory segments 222-6 and 222-7 are allocated as over-provisioned space. The "isHole" bit of SUT for the additional memory segments will be set to 0 so that these additional memory segments can be reused as free segments accepting new objects.

After entries in the data structure have been re-mapped as over-provisioned space, for example, by executing the example SUT definition above, the re-mapped memory segment can be allocated for use as over-provisioned space for the computing system.

Figure 3:
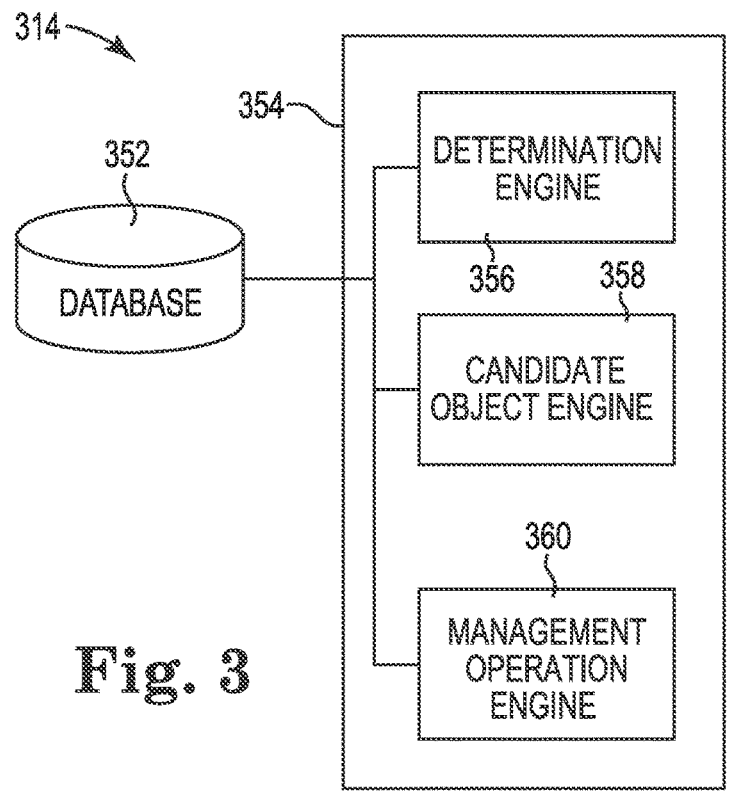
FIG. 3 is a diagram of a system for log-structured file system memory management operations according to one or more embodiments of the present disclosure.

FIG. 3 is a diagram of a system 314 for log-structured file system memory management operations according to one or more embodiments of the present disclosure. The system 314 can include a database 352, a subsystem 354, and/or a number of engines, for example a determination engine 356, a candidate object engine 358, and/or a management operation engine 360, and can be in communication with the database 352 via a communication link. The system 314 can include additional or fewer engines than illustrated to perform the various functions described herein. The system can represent program instructions and/or hardware of a machine (e.g., the machine 462 as referenced in FIG. 4, etc.). As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, a field programmable gate array, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the determination engine 356 can include a combination of hardware and program instructions that is configured to determine an amount (e.g., an aggregate amount) of over-provisioned computing resources assigned to a plurality of log-structured file system (LFS) objects that are allocated for performance of memory management operations associated with a virtual storage area network (vSAN). In some embodiments, the candidate object engine 358 can include a combination of hardware and program instructions that is configured to select a subset of LFS objects that are candidates for performance of a particular memory management operation based on the determined amount of over-provisioned computing resources consumed by each LFS object exceeding a resource consumption threshold. The resource consumption threshold can be set based on the determined segment cleaning costs described in connection with FIG. 5, herein. For example, the resource consumption threshold can correspond to a threshold segment cleaning cost associated with performance of memory management operations for a computing system. The resource threshold consumption threshold can be a predetermined threshold value above which the segment cleaning cost is high enough that additional memory segments can be re-allocated for use as provisioned space and, below which, the segment cleaning cost is low enough that memory segments allocated as over-provisioned space can be unmapped and re-allocated for normal use. In some embodiments, the management operation engine 360 can include a combination of hardware and program instructions that is configured to perform the particular memory management operation on at least one memory segment in which at least a portion of one or more of the candidate LFS objects is stored.

Figure 4:
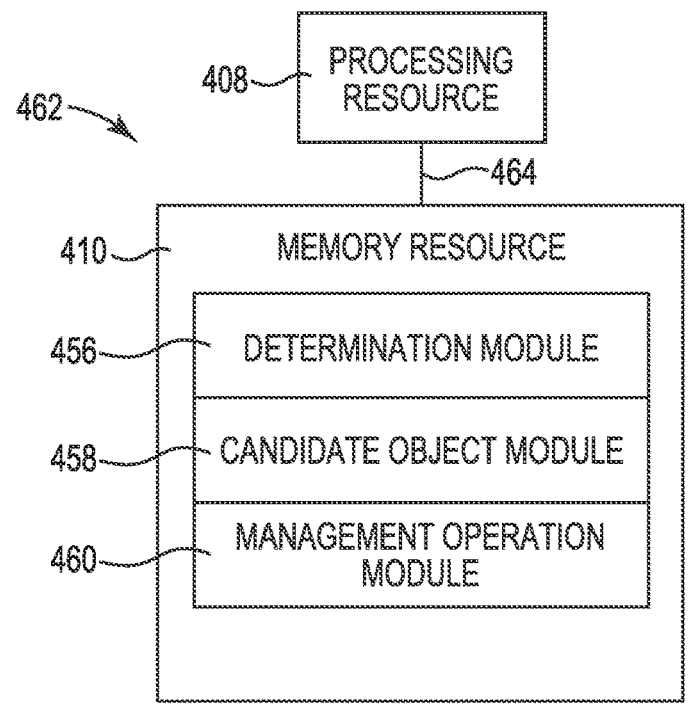
FIG. 4 is a diagram of a machine for log-structured file system memory management operations according to one or more embodiments of the present disclosure.

FIG. 4 is a diagram of a machine for log-structured file system memory management operations according to one or more embodiments of the present disclosure. The machine 462 can utilize software, hardware, firmware, and/or logic to perform a number of functions. The machine 462 can be a combination of hardware and program instructions configured to perform a number of functions (e.g., actions). The hardware, for example, can include a number of processing resources 408 and a number of memory resources 410, such as a machine-readable medium (MRM) or other memory resources 410. The memory resources 410 can be internal and/or external to the machine 462 (e.g., the machine 462 can include internal memory resources and have access to external memory resources). In some embodiments, the machine 462 can be a VCI. The program instructions (e.g., machine-readable instructions (MRI)) can include instructions stored on the MRM to implement a particular function (e.g., an action such as creating a live snapshot at an end of a snapshot chain, as described herein). The set of MRI can be executable by one or more of the processing resources 408. The memory resources 410 can be coupled to the machine 462 in a wired and/or wireless manner. For example, the memory resources 410 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 410 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change memory (PCM), 3D cross-point, ferroelectric transistor random access memory (FeTRAM), ferroelectric random access memory (FeRAM), magneto random access memory (MRAM), Spin Transfer Torque (STT)-MRAM, conductive bridging RAM (CBRAIVI), resistive random access memory (RRAM), oxide based RRAM (OxRAIVI), negative-or (NOR) flash memory, magnetic memory, optical memory, NVMe devices, and/or a solid state drive (SSD), etc., as well as other types of machine-readable media.

The processing resources 408 can be coupled to the memory resources 410 via a communication path 464. The communication path 464 can be local or remote to the machine 462. Examples of a local communication path 464 can include an electronic bus internal to a machine, where the memory resources 410 are in communication with the processing resources 408 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), Peripheral Component Interconnect express (PCIe) among other types of electronic buses and variants thereof. The communication path 464 can be such that the memory resources 410 are remote from the processing resources 408, such as in a network connection between the memory resources 410 and the processing resources 408. That is, the communication path 464 can be a network connection. Examples of such a network connection can include a local area network (LAN), wide area network (WAN), personal area network (PAN), and the Internet, among others.

As shown in FIG. 4, the MRI stored in the memory resources 410 can be segmented into a number of modules 456, 458, 460 that when executed by the processing resources 408 can perform a number of functions. As used herein a module includes a set of instructions included to perform a particular task or action. The number of modules 456, 458, 460 can be sub-modules of other modules. For example, the management operation module 460 can be a sub-module of the candidate object module 458 and/or can be contained within a single module. Furthermore, the number of modules 456, 458, 460 can comprise individual modules separate and distinct from one another. Examples are not limited to the specific modules 456, 458, 460 illustrated in FIG. 4.

Each of the number of modules 456, 458, 460 can include program instructions and/or a combination of hardware and program instructions that, when executed by a processing resource 408, can function as a corresponding engine as described with respect to FIG. 3. For example, the determination module 456 can include program instructions and/or a combination of hardware and program instructions that, when executed by a processing resource 408, can function as the determination engine 356, though embodiments of the present disclosure are not so limited.

For example, the machine 462 can include a determination module 456, which can include instructions to determine an amount of over-provisioned computing resources assigned to a plurality of log-structured file system (LFS) objects that are allocated for performance of memory management operations associated with a virtual storage area network (vSAN). The machine 462 can include a candidate object module 458, which can include instructions to select a subset of LFS objects that are candidates for performance of a particular memory management operation based on the determined amount of over-provisioned computing resources consumed by each LFS object exceeding a resource consumption threshold. The machine 462 can include a management operation module 460, which can include instructions to perform the particular memory management operation on at least one memory segment in which at least a portion of one or more of the candidate LFS objects is stored.

Figure 5:
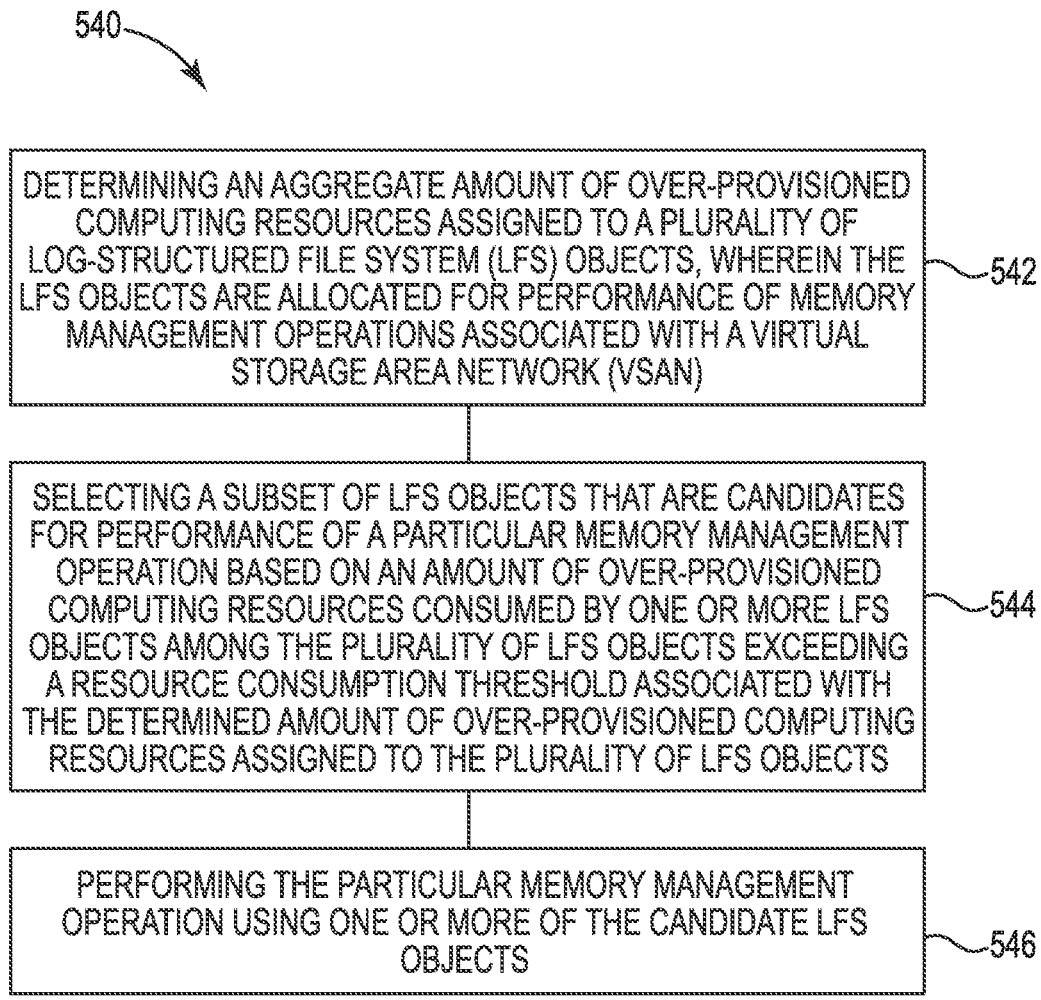
FIG. 5 is a flow diagram corresponding to a method for log-structured file system memory management operations according to one or more embodiments of the present disclosure.

FIG. 5 is a flow diagram corresponding to a method 540 for log-structured file system memory management operations according to one or more embodiments of the present disclosure. The method 540 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 540 is performed by the LFS management operation controller 114 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 542, the method 540 can include determining an aggregate amount of over-provisioned computing resources assigned to a plurality of log-structured file system (LFS) objects, wherein the LFS objects are allocated for performance of memory management operations associated with a virtual storage area network (vSAN). In some embodiments, the method 540 can include determining the amount of over-provisioned computing resources by determining a quantity of data read into the at least one memory segment as part of performance of a preceding memory management operation and a quantity of data written out of the at least one memory segment as part of performance of the preceding memory management operation during a particular period of time. Further, in some embodiments, the method 540 can include determining an amount of an amount of over-provisioned computing resources consumed by one or more LFS objects by determining a quantity of data read into the at least one memory segment as part of performance of a preceding memory management operation and a quantity of data written out of the at least one memory segment as part of performance of the preceding memory management operation during a particular period of time.

At block 544, the method 540 can include selecting a subset of LFS objects that are candidates for performance of a particular memory management operation based on an amount of over-provisioned computing resources consumed by one or more LFS objects among the plurality of LFS objects exceeding a resource consumption threshold associated with the determined amount of over-provisioned computing resources assigned to the plurality of LFS objects. In some embodiments, the method 540 can include selecting the subset of LFS objects by selecting LFS objects that exhibit greater than a threshold quantity of non-consecutive writes for inclusion in the subset of LFS objects. Embodiments are not so limited, however, and in some embodiments, the method 540 can include selecting the subset of LFS objects by selecting LFS objects that exhibit write traffic characteristics greater than a threshold write traffic frequency for inclusion in the subset of LFS objects.

In some embodiments, the subset of LFS objects can be selected based on a determined segment cleaning cost associated with each of the LFS objects over a given period of time. In a non-limiting example in which the given period of time is ten (10) minutes, a quantity of memory blocks or memory segments (e.g., the memory segments 223 illustrated in FIGS. 2A-2C, herein) that are read and/or written as part of performance of a segment cleaning operation during the period of time can be determined. The quantity of memory blocks read and the quantity of memory blocks written during the period of time can be summed (with appropriate correction for the difference in wear cost between read operations and write operations) to yield a total segment cleaning cost for a given period of time.

In some embodiments, the segment cleaning cost can be determined in connection with observation of determined segment cleaning costs over a given period of time within a sliding window over the given period of time. Continuing with the above non-limiting example in which the given period of time is ten (10) minutes, the sliding window can be maintained over a ten (10) minute period of time that is further subdivided into one (1) minute chunks, for example. The total segment cleaning cost over the ten (10) minute sliding window can then be calculated by summing the segment cleaning cost that is determined over each minute, as shown in Equation 1:

$$\text{Total Segment Cleaning Cost}(t) = \sum_{t-9}^{t} \text{Segment Cleaning Cost} \quad (1)$$

where t is time in minutes and the segment cleaning cost is summed over ten (10) minutes (e.g., from t−9 minutes to t minutes). In some embodiments, an oldest segment cleaning cost (e.g., a segment cleaning cost that was determined at a time greater than ten (10) minutes prior) can be allowed to "roll off" the sliding window, thereby allowing for a segment cleaning cost with a newer time (e.g., a newest segment cleaning cost) to be added to the sliding window. For example, at an eleventh minute, the sliding window can include information corresponding to the segment cleaning costs from the second minute to the eleventh minute (as the information corresponding to the segment cleaning cost for the first observed minute has "rolled off" the sliding window). Embodiments are, however, not limited to this specific, enumerated example and the total segment cleaning cost can be summed over greater than ten (10) minutes or less than ten (10) minutes. In addition, the constituent segment cleaning costs can be determined for time intervals greater than one (1) minute or less than one (1) minute.

In some embodiments, LFS management operation controller 114 of FIG. 1 can monitor the segment cleaning costs during the time period described above (e.g., within the sliding window) to determine if the segment cleaning cost for one or more subdivisions of time in the sliding window has exceeded the resource consumption threshold. As described above, if the resource consumption threshold is exceeded for one or more of the subdivisions of time within the sliding window, the LFS management operation controller can perform operations to increase the amount of over-provisioned resources available to the computing system for garbage collection and/or segment cleaning operations. Further, if the segment cleaning cost is less than the resource consumption threshold is for one or more of the subdivisions of time within the sliding window, the LFS management operation controller can perform operations to decrease the amount of over-provisioned resources available to the computing system for garbage collection and/or segment cleaning operations.

At block 546, the method 540 can include performing the particular memory management operation on at least one memory segment in which at least a portion of one or more of the candidate LFS objects is stored. In some embodiments, the memory management operation can be a garbage collection operation and/or a segment cleaning operation. As described above, garbage collection operations and segment cleaning operations are operations in which data is migrated from one portion of a memory resource to another to free up memory resources within a computing system.

In some embodiments, the method 540 can include increasing an amount of over-provisioned computing resources available for performing the memory management operation for the at least one memory segment in response to determining that the at least one memory segment contains data corresponding to a particular LFS object that is included in the subset of LFS objects. Conversely, in some embodiments, the method 540 can include decreasing an amount of over-provisioned computing resources available for performing the memory management operation for the at least one memory segment in response to determining that the at least one memory segment contains data corresponding to an object that is not included in the subset of LFS objects.

In the course of determining whether to reallocate over-provisioned space available to the LFS objects, the LFS objects can be sorted based on the segment cleaning cost associated with each of the LFS objects. Once the LFS objects have been sorted (e.g., ranked, listed, etc.) based on their respective segment cleaning costs, it can be determined whether each LFS object lies above a segment cleaning cost threshold or below a segment cleaning cost threshold. For LFS objects that lie above the segment cleaning cost threshold, the amount of over-provisioned space available for performance of a segment cleaning operation can be increased as described in connection with FIG. 2C, herein. Conversely, for LFS objects that lie below the segment cleaning cost threshold, the amount of over-provisioned space available for performance of a segment cleaning operation can be decreased as described in connection with FIG. 2B, herein.

That is, prior to performing the memory management operation, over-provisioned space available to the subset of LFS objects can be reallocated using the adaptive memory management operation methodologies described herein. This can reduce the overall overhead consumption associated with performance of memory management operations in comparison to approaches in which static amounts of resources are over-provisioned. For example, as described above in connection with FIGS. 2A-2C, memory segments can be unmapped (thereby freeing up available over-provisioned resources that may not be needed in performance of the memory management operation) as described in connection with FIG. 2B and remapped (thereby increasing the amount of over-provisioned resources available to objects in performance of memory management operations) as described in connection with FIG. 2C.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   determining an aggregate amount of over-provisioned computing resources assigned to a plurality of log-structured file system (LFS) objects written to one or more memory segments, wherein the LFS objects are allocated for performance of memory management operations associated with a virtual storage area network (vSAN);
   determining whether to unmap or remap a particular memory segment associated with the vSAN based on the determined aggregate amount of over-provisioning computing resources;
   writing, to a data structure that comprises a segment usage table (SUT) that is associated with the vSAN, an index that is assigned based on a ratio of an address in the SUT and a quantity of data associated with the particular memory segment and information corresponding to whether the particular memory segment has been unmapped or remapped;
   selecting a subset of LFS objects that are candidates for performance of a particular memory management operation based on an amount of over-provisioned computing resources consumed by one or more LFS objects among the plurality of LFS objects exceeding a resource consumption threshold associated with the determined amount of over-provisioned computing resources assigned to the plurality of LFS objects and the index written to the SUT and the information written to the SUT corresponding to whether the segment has been unmapped or remapped; and
   performing the particular memory management operation using one or more of the candidate LFS objects; and
   allocating the particular memory segment as over-provisioned space when the particular memory segment has been unmapped and allocating the particular memory segment as non-over-provisioned space when the particular memory segment has been remapped.

2. The method of claim 1, further comprising determining the aggregate amount of over-provisioned computing resources or the amount of over-provisioned computing resources consumed by the one or more LFS objects, or both, by determining a quantity of data read into at least one memory segment as part of performance of a preceding memory management operation and a quantity of data written out of the at least one memory segment as part of performance of the preceding memory management operation during a particular period of time.

3. The method of claim 1, wherein the memory management operation comprises a garbage collection operation or a segment cleaning operation, or both.

4. The method of claim 1, further comprising selecting the subset of LFS objects by selecting LFS objects that exhibit greater than a threshold quantity of non-consecutive writes for inclusion in the subset of LFS objects.

5. The method of claim 1, further comprising selecting the subset of LFS objects by selecting LFS objects that exhibit write traffic characteristics greater than a threshold write traffic frequency for inclusion in the subset of LFS objects.

6. The method of claim 1, further comprising increasing an amount of over-provisioned computing resources available for performing the memory management operation for at least one memory segment in response to determining that the at least one memory segment contains data corresponding to a particular LFS object that is included in the subset of LFS objects.

7. The method of claim 1, further comprising decreasing an amount of over-provisioned computing resources available for performing the memory management operation for the at least one memory segment in response to determining that the at least one memory segment contains data corresponding to an object that is not included in the subset of LFS objects.

8. A non-transitory machine-readable medium having instructions stored thereon which, when executed by a processor, cause the processor to:
- determine an aggregate amount of over-provisioned computing resources assigned to a plurality of log-structured file system (LFS) objects written to one or more memory segments, wherein the LFS objects are allocated for performance of memory management operations associated with a virtual storage area network (vSAN);
- determining whether to unmap or remap a particular memory segment associated with the vSAN based on the determined aggregate amount of over-provisioning computing resources;
- writing, to a data structure that comprises a segment usage table (SUT) that is associated with the vSAN, an index that is assigned based on a ratio of an address in the SUT and a quantity of data associated with the particular memory segment and information corresponding to whether the particular memory segment has been unmapped or remapped;
- select a subset of LFS objects that are candidates for performance of a particular memory management operation based on an amount of over-provisioned computing resources consumed by one or more LFS objects among the plurality of LFS objects exceeding a resource consumption threshold associated with the determined amount of over-provisioned computing resources assigned to the plurality of LFS objects and the index written to the SUT and the information written to the SUT corresponding to whether the segment has been unmapped or remapped;
- perform the particular memory management operation using one or more of the candidate LFS objects; and
- allocate the particular memory segment as over-provisioned space when the particular memory segment has been unmapped and allocating the particular memory segment as non-over-provisioned space when the particular memory segment has been remapped.

9. The medium of claim 8, including instructions to determine the aggregate amount of over-provisioned computing resources or the amount of over-provisioned computing resources consumed by the one or more LFS objects, or both, by determining a quantity of data read into the at least one memory segment as part of performance of a preceding memory management operation and a quantity of data written out of the at least one memory segment as part of performance of the preceding memory management operation during a particular period of time.

10. The medium of claim 8, including instructions to perform a garbage collection operation or a segment cleaning operation, or both, as part of performance of the particular memory management operation.

11. The medium of claim 8, including instructions to select the subset of LFS objects by selecting LFS objects that exhibit greater than a threshold quantity of non-consecutive writes for inclusion in the subset of LFS objects.

12. The medium of claim 8, including instructions to select the subset of LFS objects by selecting LFS objects that exhibit write traffic characteristics greater than a threshold write traffic frequency for inclusion in the subset of LFS objects.

13. The medium of claim 8, including instructions to increase an amount of over-provisioned computing resources available for performing the memory management operation for at least one memory segment in response to determining that the at least one memory segment contains data corresponding to a particular LFS object that is included in the subset of LFS objects.

14. The medium of claim 8, including instructions to decrease an amount of over-provisioned computing resources available for performing the memory management operation for the at least one memory segment in response to determining that the at least one memory segment contains data corresponding to an object that is not included in the subset of LFS objects.

15. A system, comprising:
a number of processors configured to:
- determine an aggregate amount of over-provisioned computing resources assigned to a plurality of log-structured file system (LFS) objects written to one or more memory segments coupled to the number of processors, wherein the LFS objects are allocated for performance of memory management operations associated with a virtual storage area network (vSAN);
- determine whether to unmap or remap a particular memory segment associated with the vSAN based on the determined aggregate amount of over-provisioning computing resources;
- write, to a segment usage table (SUT) associated with the vSAN, an index that is assigned based on a ratio of an address in the SUT and a quantity of data associated with the particular memory segment and information corresponding to whether the particular memory segment has been unmapped or remapped;
- select a subset of LFS objects that are candidates for performance of a particular memory management operation based on an amount of over-provisioned computing resources consumed by one or more LFS objects among the plurality of LFS objects exceeding a resource consumption threshold associated with the determined amount of over-provisioned computing resources assigned to the plurality of LFS objects and the index written to the SUT and the information written to the SUT corresponding to whether the segment has been unmapped or remapped;
- perform the particular memory management operation using one or more of the candidate LFS objects; and
- allocate the particular memory segment as over-provisioned space when the particular memory segment has been unmapped and allocating the particular memory segment as non-over-provisioned space when the particular memory segment has been remapped.

16. The system of claim 15, wherein the number of processors are configured to determine the total amount of over-provisioned computing resources or the amount of over-provisioned computing resources consumed by the one or more LFS objects, or both, by determining a quantity of data read into the at least one memory segment as part of performance of a preceding memory management operation and a quantity of data written out of the at least one memory segment as part of performance of the preceding memory management operation during a particular period of time.

17. The system of claim 15, wherein the number of processors are configured to select the subset of LFS objects by selecting LFS objects that exhibit greater than a threshold quantity of non-consecutive writes for inclusion in the subset of LFS objects.

18. The system of claim 15, wherein the number of processors are configured to select the subset of LFS objects by selecting LFS objects that exhibit write traffic characteristics greater than a threshold write traffic frequency for inclusion in the subset of LFS objects.

19. The system of claim 15, wherein the number of processors are configured to increase an amount of over-provisioned computing resources available for performing the memory management operation for at least one memory segment in response to determining that the at least one memory segment contains data corresponding to a particular LFS object that is included in the subset of LFS objects.

20. The system of claim 15, wherein the number of processors are configured to decrease an amount of over-provisioned computing resources available for performing the memory management operation for the at least one memory segment in response to determining that the at least one memory segment contains data corresponding to an object that is not included in the subset of LFS objects.

* * * * *